(12) United States Patent
Yoshida et al.

(10) Patent No.: US 6,479,914 B2
(45) Date of Patent: Nov. 12, 2002

(54) VIBRATION MOTOR HAVING AN ECCENTRIC WEIGHT AND DEVICE INCLUDING THE SAME MOTOR

(75) Inventors: Shigeru Yoshida, Tottori (JP); Kodo Fukuoka, Tottori (JP); Kouji Kuyama, Tottori (JP); Toshiaki Tsuzaki, Tottori (JP)

(73) Assignee: Matsushita Electric Industrial, Osaka (JP)

( * ) Notice: Subject to any disclaimer, the term of this patent is extended or adjusted under 35 U.S.C. 154(b) by 0 days.

(21) Appl. No.: 09/770,698

(22) Filed: Jan. 26, 2001

(65) Prior Publication Data

US 2002/0047369 A1 Apr. 25, 2002

(30) Foreign Application Priority Data

Jan. 28, 2000 (JP) ........................................ 2000-019819

(51) Int. Cl.$^7$ .............................. B06B 1/16; B06B 1/04; H02K 7/065
(52) U.S. Cl. ................... 310/81; 310/67 R; 310/156.38
(58) Field of Search ................................ 310/81, 67 R, 310/153.38, 156.43, 156.45, 156.46

(56) References Cited

U.S. PATENT DOCUMENTS

| | | | | |
|---|---|---|---|---|
| 3,584,249 A | * | 6/1971 | Murphy | ...................... 310/193 |
| 4,864,276 A | | 9/1989 | Tribbey et al. | .............. 340/407 |
| 5,373,207 A | * | 12/1994 | Yamaguchi et al. | .. 310/40 MM |
| 5,892,306 A | * | 4/1999 | Lloyd | .......................... 310/269 |
| 6,326,711 B1 | * | 12/2001 | Yamaguchi et al. | ....... 310/67 R |

FOREIGN PATENT DOCUMENTS

| | | | | |
|---|---|---|---|---|
| EP | 1 016 467 | 7/2000 | ............. B06B/1/04 |
| JP | 6-52363 | 7/1994 | |
| JP | 6-284662 | 10/1994 | |
| JP | 9-93862 | 4/1997 | .......... H02K/7/075 |
| JP | 10-248203 | 9/1998 | .......... H02K/7/065 |
| JP | 11-98761 | 4/1999 | .......... H02K/7/065 |
| JP | 11-341769 | 12/1999 | .......... H02K/21/22 |
| JP | 2000-262969 | 9/2000 | ............. B06B/1/04 |

* cited by examiner

Primary Examiner—Burton S. Mullins
(74) Attorney, Agent, or Firm—RatnerPrestia

(57) ABSTRACT

A motor includes a stator and a rotor facing the stator. The rotor has a magnet and an eccentric weight. The magnet is magnetized in a rotational direction and produces driving magnetic field. The eccentric weight is made of the material having a greater specific gravity than the magnet. The magnet shapes in a cylinder and a part of the cylinder is cut away to form a space. The eccentric weight is placed in the space. A rotational area of the magnet and that of the eccentric weight overlap each other. In this structure, rotation of the rotor spins the eccentric weight, thereby producing large vibrations. The eccentric weight is accommodated by a motor housing for the safety. The thin and compact motor is thus obtainable.

21 Claims, 10 Drawing Sheets

VIBRATION MOTOR HAVING AN ECCENTRIC WEIGHT AND DEVICE INCLUDING THE SAME MOTOR

FIELD OF THE INVENTION

The present invention relates to a vibration motor, mounted to a communication device, for alerting a user to a message arrival with mechanical vibrations, and the portable communication device using the motor. More particularly, the present invention relates to a motor having an eccentric weight in order to generate greater vibrations. The eccentric weight is accommodated in the motor housing for safety reasons, and yet the motor is small in size.

BACKGROUND OF THE INVENTION

A driving shaft of a motor is coupled to an eccentric weight, and the motor is spin for rotating the weight, thereby generating desired vibrations. This is a principle of a vibration motor used in a portable communication device such as a pager. However, a fan-shaped or semicircle eccentric weight has been exposed during the rotation, and this has caused some danger. Recently, it is thus proposed that the eccentric weight be housed in the motor case. For instance, Japanese Utility Model Application Non-Examined Publication No. H06-52363 discloses one of the proposed vibration motors.

On the other hand, a part of a rotor is eliminated so that unbalance is produced in the vibration motor. This method can save the eccentric weight, and lower the cost. For instance, Japanese Patent Application Non-Examined Publication No. H06-284662 discloses that a magnet of a rotor of a brush-less motor is cut away by a range of 90°–180° thereby eliminating the eccentric weight. As such, saving the weight seems advantageous to a cost reduction purpose.

Recently, however, the portable communication devices, typically represented by a cellular phone, have been drastically downsized as well as light-weighted. The vibration motor thus should be minimized in size while it keeps a given level of vibrations. The motor with a cut-away magnet discussed above thus must use a substantially large magnet to obtain a required level of vibrations because the specific gravity of the magnet is no more than five (5). The dimensions of this motor include the space of this magnet, therefore, downsizing of this motor comes to a deadlock sooner or later.

SUMMARY OF THE INVENTION

The present invention addresses the problems discussed above, and aims to provide a vibration motor that generates large vibrations using an eccentric weight. The weight is accommodated in a motor housing for safety reasons, and yet the motor is small in size.

The vibration motor of the present invention comprises the following elements:

a stator; and a rotor facing the stator, in the rotor, magnet and an eccentric weight, of which specific gravity is greater than that of the magnet, are disposed such that a rotational area of the magnet overlaps at least with a part of a rotational area of the eccentric weight.

This structure allows the eccentric weight and the magnet to share a part of their rotational areas. In other words, the magnet is placed in the rotational area of the weight except the area occupied by the weight, so that an entire space of the motor wastes less space. Thus the space can be used in a high density, thereby realizing a thin and compact motor as well as providing the motor generating large vibrations. The rotational area means a space occupied by an object rotating on a center axis.

Another vibration motor of the present invention comprises the following elements:

a stator having a stator core; and a rotor including cylindrical magnet and an eccentric weight of which specific gravity is greater than that of the magnet, where the stator core faces the magnet in the radial direction, and a magnetic center of the magnet differs in an axial direction from a magnetic center of the stator core. Also, at least a part of the eccentric weight is placed at a cut-away section of the magnet.

This deviation of the magnetic center of the magnet from that of the stator core in the axial direction allows the magnet to be attracted toward the stator core, i.e., producing magnetic thrust. This magnetic thrust prevents the rotor from coming off the bearing fixed to the stator, and also allows the rotor to rotate in a stable manner with being journaled by the bearing. This structure can be expressed that a part of the magnet is replaced with the eccentric weight, and the replaced magnet section contributes to torque production of the motor, yet its contribution factor is small. Therefore, partial cut-away of the magnet just slightly lowers characteristics of the motor. The thin and compact motor generating large vibrations can be thus obtained.

A device of the present invention comprises the following elements:

a motor;

a board on which the motor is mounted;

a driver for driving the motor, where the motor comprises the elements respectively discussed above.

These structures allow the device of the present invention to be thin and compact as well as to generate and deliver large vibrations to a user.

DETAILED DESCRIPTION OF THE INVENTION

Figure 1:
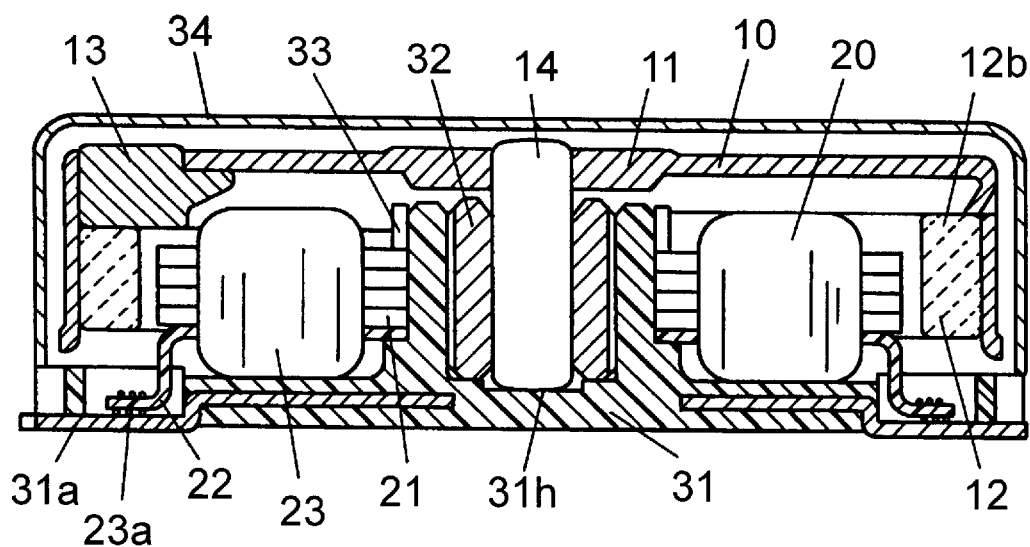
FIG. 1 is a cross section illustrating a structure of a motor in accordance with a first exemplary embodiment of the present invention.
Figure 2A:
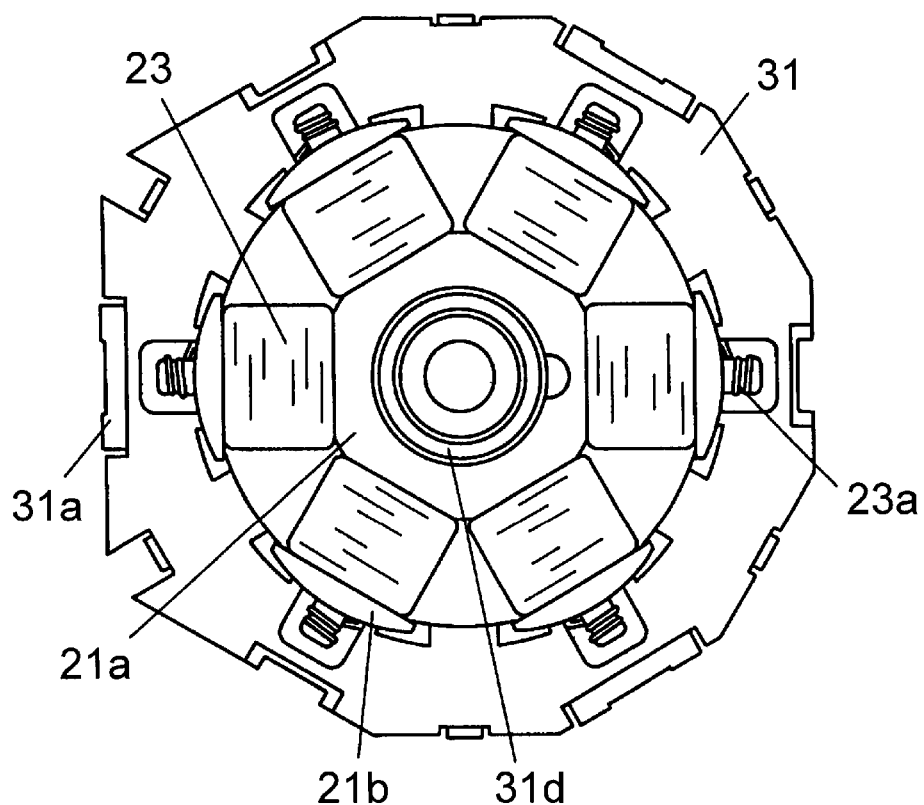
FIG. 2A is a plan view showing a combination of a motor base and a stator in the first embodiment.
Figure 2B:
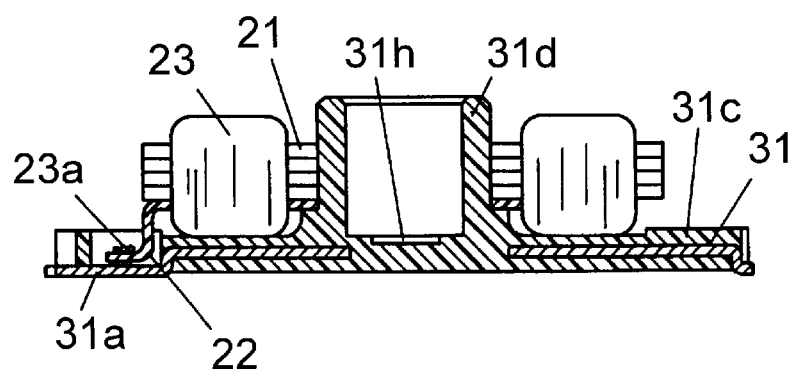
FIG. 2B is a cross section of the combination in the first embodiment.
Figure 3A:
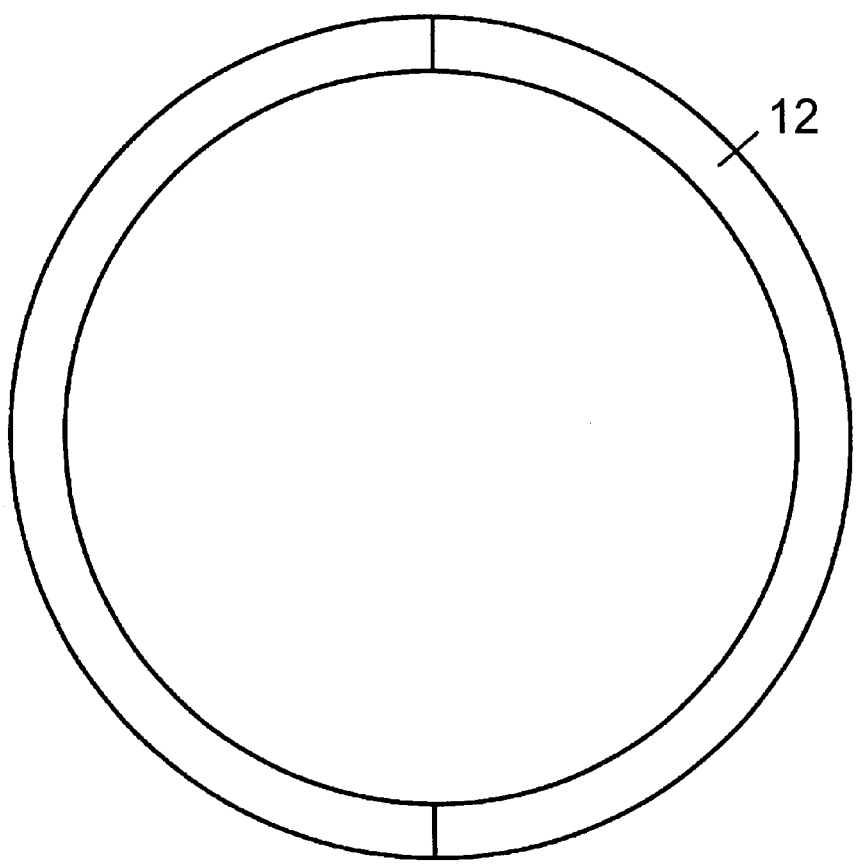
FIG. 3A is a top view of a magnet in the first embodiment.
Figure 3B:
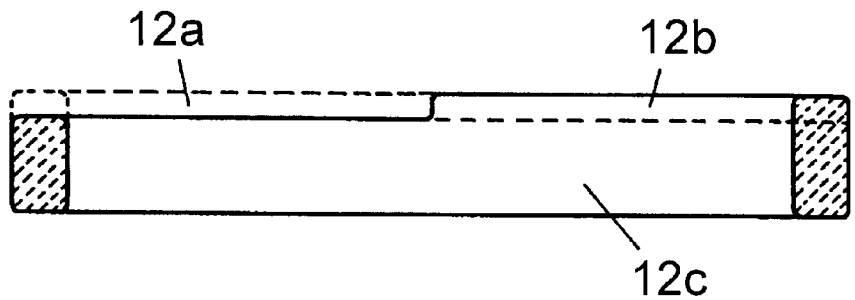
FIG. 3B is a lateral cross section of the magnet in the first embodiment.
Figure 4:
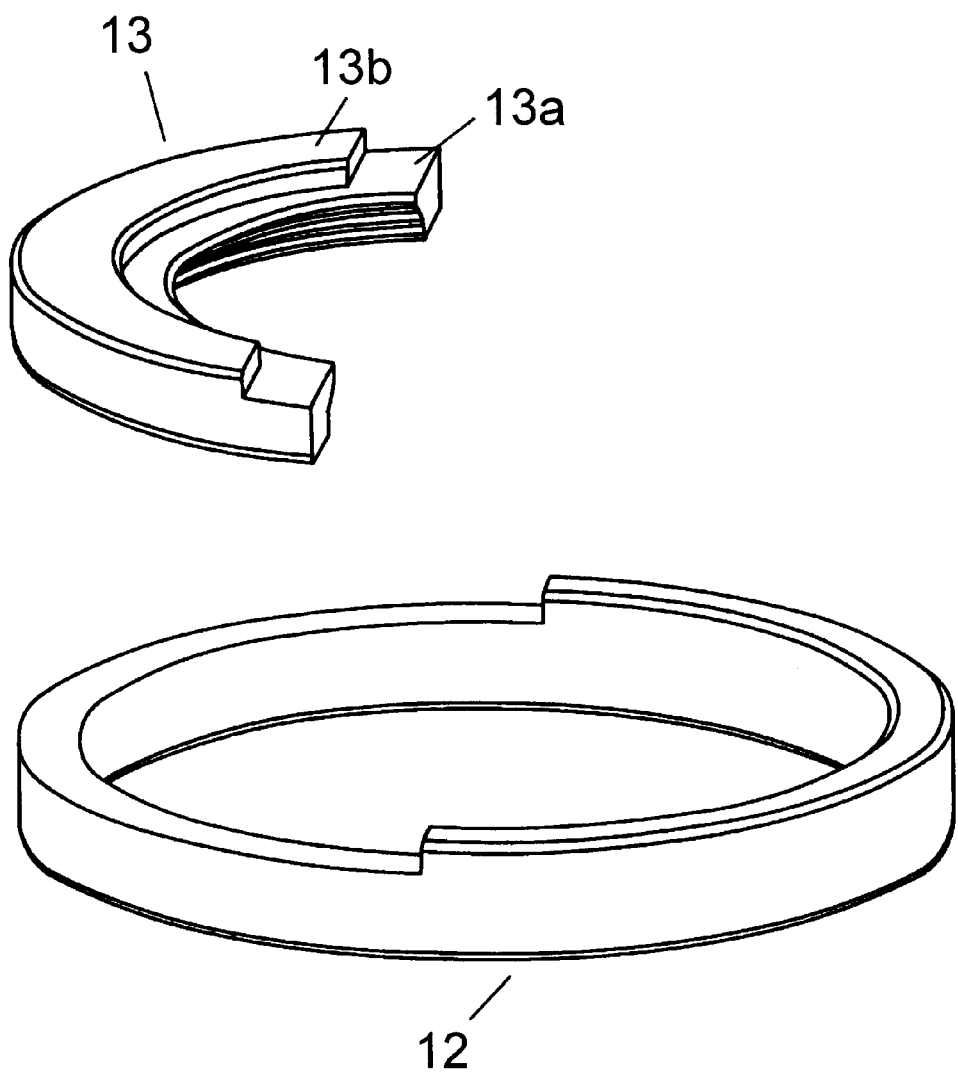
FIG. 4 is an exploded perspective view illustrating shapes of the magnet and an eccentric weight as well as positional relation in a circumferential direction of both the elements in the first embodiment.

Exemplary embodiments of the present invention are demonstrated hereinafter with reference to the accompanying drawings. Motors used in respective embodiments are flat brush-less DC motors (referred to simply as a motor) for generating vibrations and used in cellular phones.
First Exemplary Embodiment FIG. 1 is a cross section illustrating a structure of a motor in accordance with the first exemplary embodiment of the present invention. FIG. 2A is a plan view showing a combination of a motor base and a stator in the first embodiment. FIG. 2B is a cross section of the combination in the first embodiment. FIG. 3A is a top view of a magnet in the first embodiment. FIG. 3B is a lateral cross section of the magnet in the first embodiment. FIG. 4 is an exploded perspective view illustrating shapes of the magnet and an eccentric weight as well as positional relation in a circumferential direction of both the elements in the first embodiment.

In FIG. 1, the motor comprises stator 20 (stationary section) and rotor 10 (rotary section) and cover 34.

Rotor 10 includes cup-shaped rotor frame 11 and ring-shaped magnet 12 mounted to the inner wall of rotor frame 11. Further, eccentric weight 13 is mounted to frame 11. Rotor 10 rotates on shaft 14 mounted to the center of frame 11.

Stator 20 is formed by combining motor-base 31 with a stator assembly, which comprises stator core 21, winding 23 and wire terminating member 22. Bearing 32 is disposed at the center of base 31. Shaft 14 is inserted into bearing 32, and rotor 10 is journaled by bearing 32. Wire-end 23a of winding 23 wound on core 21 is coupled to terminal 31a. An outer wall of stator 20 faces an inner wall of magnet 12 in the radial direction. Cover 34 covers those elements.

Terminal 31a is exposed from a bottom face of the motor and is ready for being soldered to a board of a device (cellular phone) by reflow soldering. Winding 23 is powered and controlled via terminal 31a, so that rotor 10 spins. Eccentric weight 13 mounted to rotor 10 causes vibration due to the spin of rotor 10, thereby vibrating the device.

Stator 20, a main element of the motor, is described with reference to FIGS. 2A and 2B. Motor base 31 includes base section 31c molded of resin and shaping in substantially flat board and bearing supporter 31d vertically protruding from the center of base section 31c for supporting the bearing. A thrust bearing is formed of thrust bearing section 31h disposed on the bottom face of bearing supporter 31d. As shown in FIG. 2A, 6 pcs. of terminals 31a are disposed around bearing supporter 31d on base section 31c. Terminal 31a is made of metal plate and insert-molded in base section 31c made of resin. An upper face of terminal 31a is a connecting terminal for wire end 23a, and a lower face of terminal 31a is exposed from the bottom of base section 31c and functions as a mounting terminal which is reflow-soldered to a device board.

The stator assembly is mounted to bearing supporter 31d concentrically as shown in FIGS. 2A and 2B. Stator core 21 of the assembly is made of ferromagnetic substance, and includes ring 21a at the center and 6 pcs. of teeth 21b protruding in the radial direction from ring 21a. Windings 23 are wound on those teeth 21b and their wire-ends 23a are held by wire-terminating-member 22.

Rotor 10, another main element, is described with reference to FIGS. 3A, 3B and 4.

FIGS. 3A and 3B illustrate the shape of magnet 12. Ring-shaped magnet 12 is similar to that of conventional outer-rotor type motor; however, a part of magnet 12 is cut away. In other words, a half side in axial direction of magnet 12a, i.e., approx. a half circle, is cut away and cut-away space 12a is formed. Remaining magnet 12 is called "cut-away remaining area 12b" and the ring beneath magnet 12 is called "solid area 12c". Rotational space area for this magnet 12 contains the total space of area 12c, area 12a and area 12b.

A shape of eccentric weight 13 is like the cut-away area from the ring as shown in FIG. 4. Lower section 13a of the weight is to be situated inside of rotor frame 11. Upper section 13b is to be engaged with a hole of frame 11, and slightly extending above the hole. Lower section 13a is disposed at cut-away remaining area 12a shown in FIG. 3B, therefore magnet 12 shares a part of the rotational space area with weight 13.

A positional relation between magnet 12 and stator core 21 is described with reference to FIG. 1.

In an axial direction, magnet 12 extends upwardly beyond stator core 21, thereby producing magnetic-thrust-force urging an end of shaft 14 of rotor 10 against thrust bearing section 31h. In other words, rotor 10 is attracted toward stator 20. The attracting force is produced mainly by cut-away remaining area 12b on the magnet side. The motor in accordance with the first exemplary embodiment has the construction discussed above, so that a thin and compact vibration motor is obtainable with maintaining the performance and characteristics of the motor.

As such, in this first embodiment, weight 13 and magnet 12 are disposed in the same rotational space and they share a part of the rotational space. Magnet 12 is placed in the rotational space of weight 13 except the space occupied by the weight, so that wasted space can be reduced. As a result, a thin and compact motor, which can utilize its space in a high density and produce large vibrations, is obtainable.

In the motor of the first embodiment, a section of magnet 12 in a circumference direction is cut away so that a space is formed. A part of weight 13 is placed in this cut-away section. Magnet 12 is cylindricall shaped to fully exert its capability. With weight 13 occupying the cut-away section of magnet 12, the weight 13 and magnet 12 share the same rotational space. This configuration of magnet 12 and weight 13 is compact results in a thin motor, which is capable of generating large vibrations. An outer rotor type motor with cores, in particular, has a rotor magnet outside the stator cores. When such a motor has part of the magnet replaced with the eccentric weight described, large vibrations can also result.

In a conventional manner, an eccentric weight is cut away more than half circle, and nothing is placed in the cut-away section. This is a general way of producing an eccentric weight. The present invention, however, places magnet in this cut-away space to increase the motor characteristics, and this results in a motor that is compact and thin in profile and yet provides substantial vibrations.

There are several conventional methods for generating unbalance-vibrations; for instance, the following two methods have been mainly adopted: an unevenly magnetized magnet is used for generating vibrations, or partially cut-away magnet is used for generating vibrations. The present invention replaces a part of magnet having a specific gravity of approximately five (5) with an eccentric weight having a greater specific gravity (e.g. tungsten: 18), so that a much greater volume of unbalance is obtained than in the case when the partially cut-away magnet is used. As a result, the motor is compact and thin in profile with the capability of providing substantial vibrations.

Magnet 12 of the motor in accordance with the first embodiment has a cylindrical body of which envelope has an outer diameter, inner diameter, and height. The cylindrical body has a space cut away. To be more specific, a part of the half section in circumference direction is cut away in the axial direction. In other words, a non-solid cylinder with cut-away section (cut-away remaining area 12b) is axially laid on a cylinder solid in a rotating direction (solid area 12c). This solid cylinder area allows the motor to produce a flat torque; thus a quality motor with higher performance results. Also, the magnet cannot be readily damaged during handling and thereby provides high productivity. Since the magnet has solid area as well as cut-away area (replaceable area), the higher performance and productivity of the motor can be expected. The motor utilizes its space in a high density, so that compatibility of a compact and thin profile with large vibrations is obtainable.

In the first embodiment of the motor, a part of the magnet used for attraction of magnetic thrust is replaced with the eccentric weight. Regarding the replaced section of the motor, if the section is not replaced with the weight, the section of magnet also contributes to the torque production; however, its contribution factor is much smaller than that of the other magnet section confronting the stator core. Even with part of the magnet cut away, the motor characteristics do not substantially lowered.

The magnetic thrust structure discussed above allows the motor to be equipped with simply structured bearings. Partial cut-away of the magnet lowers the magnetic thrust attraction; however, the present invention downsizes the rotor, and the attraction becomes smaller accordingly, which is thus traded off with the lowering of the magnetic thrust attraction. If the attraction is still not enough, it is recommended that the height of the magnet be slightly increased, or the deviation amount also be slightly increased.

Second Exemplary Embodiment

Figure 5:
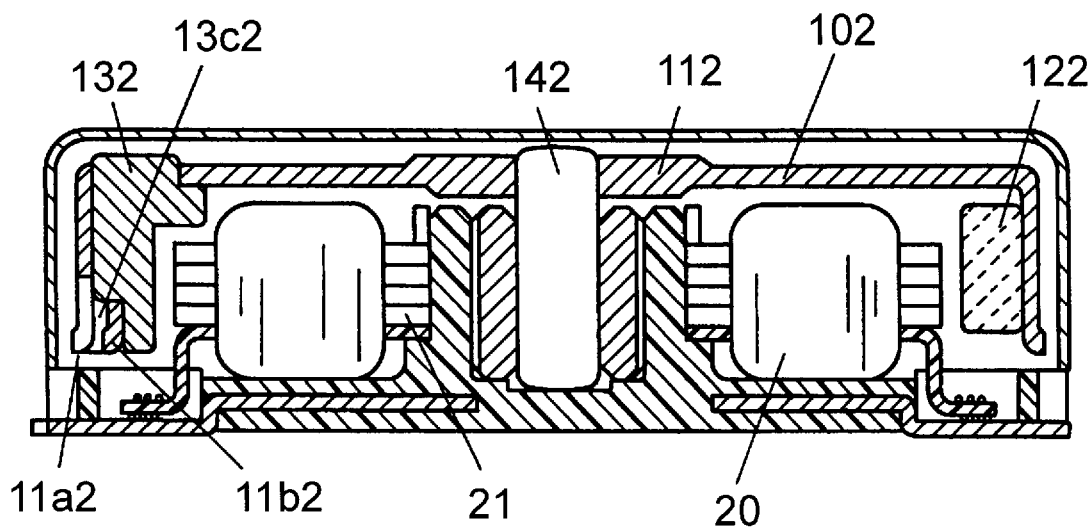
FIG. 5 is a cross section illustrating a structure of a motor in accordance with a second exemplary embodiment of the present invention.
Figure 6A:
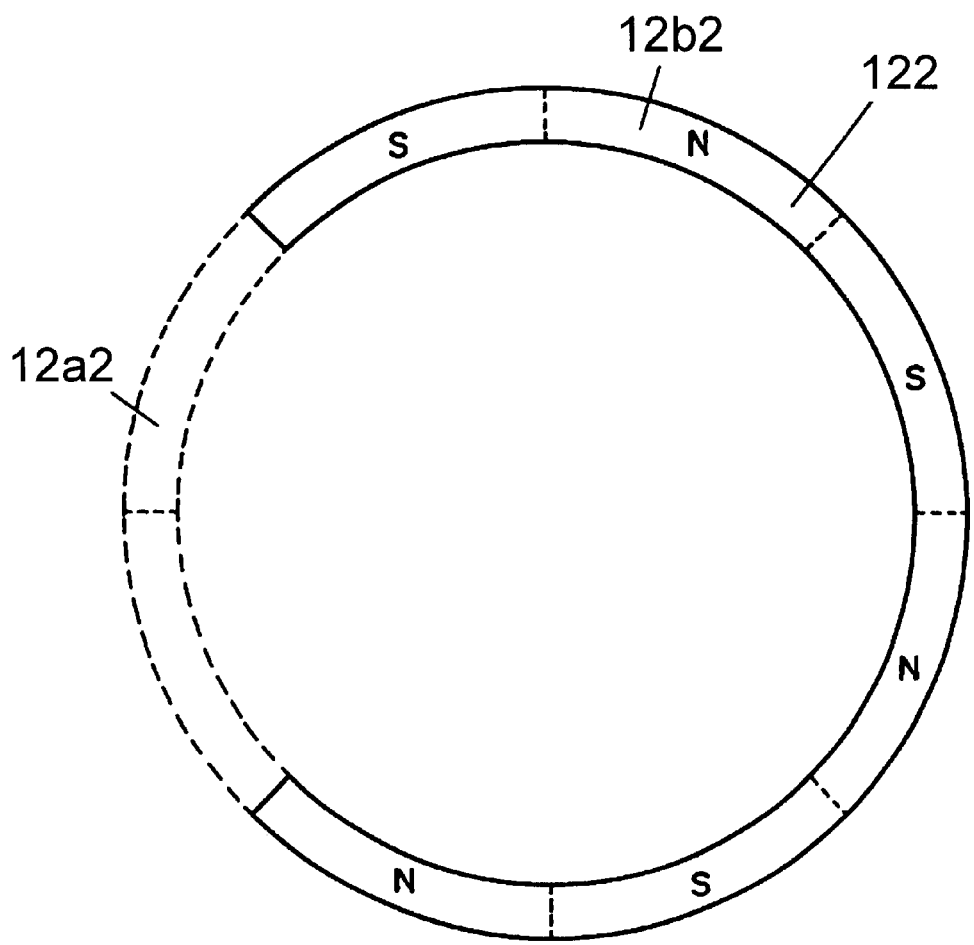
FIG. 6A is a top view of a magnet in the second embodiment.
Figure 6B:
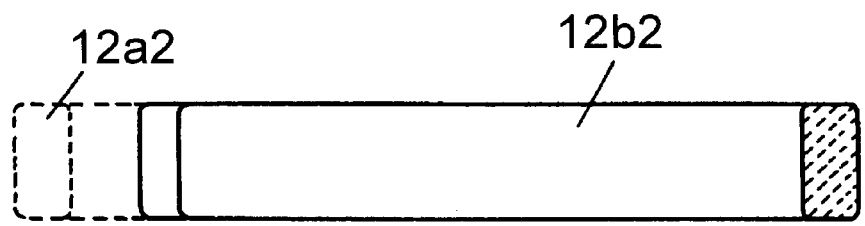
FIG. 6B is a lateral cross section of the magnet in the second embodiment.
Figure 7:
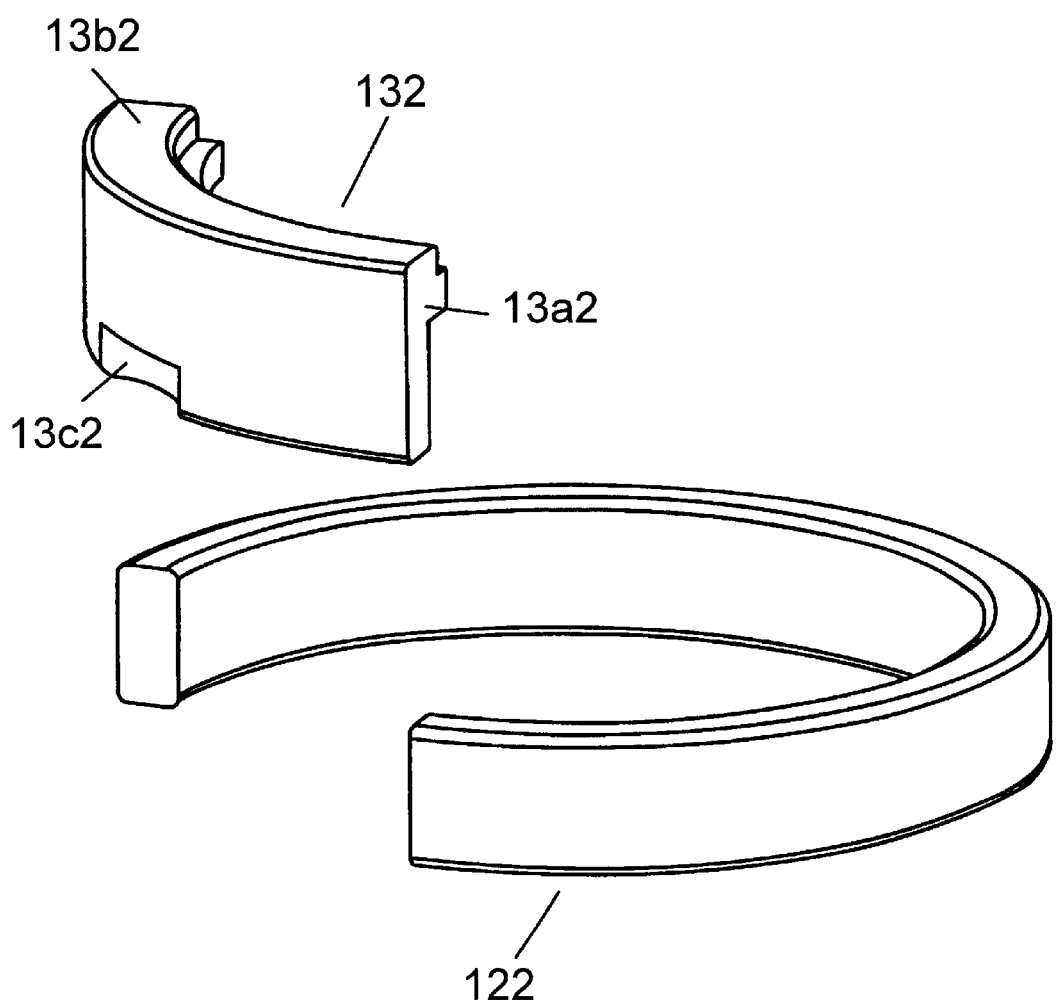
FIG. 7 is an exploded perspective view illustrating shapes of the magnet and an eccentric weight as well as positional relation in a circumferential direction of both the elements in the second embodiment.

FIG. 5 is a cross section illustrating a structure of a motor in accordance with the second exemplary embodiment of the present invention. FIG. 6A shows a top view of a magnet in the second embodiment. FIG. 6B is a lateral cross section of the same magnet. FIG. 7 shows an exploded perspective view illustrating shapes of the magnet and an eccentric weight as well as positional relation in a circumferential direction of both the elements.

The second embodiment shown in FIG. 5 differs from the first one shown in FIG. 1 mainly in a structure of the rotor. The motor used in the second embodiment has a lower and thinner profile than that of the first one. Rotor 102 is described hereinafter. Other elements are somewhat modified; however, the modifications are due to the low profile of rotor 102, thus the descriptions thereof are omitted.

In FIG. 5, magnet 122 rigidly attached to an inner wall of rotor frame 112 and is "C" shaped, i.e. a part of a ring is cut away as shown in FIG. 6A. Magnet 122 has a cut-away space 12a2 which extends for 90° in a rotational direction about the center axis, the remaining space 12b2 extends for 270° in a rotational direction about the center axis. Different from the first embodiment, there is no solid area 12c shown in FIG. 3B. Therefore, the rotational space of magnet 122 is formed by cut-away space 12a2 and cut-away remaining space 12b2. As shown in FIG. 6A, magnet 122 is magnetized in multi-poles in circumference direction, and cut-away space 12a2 corresponds to the angle of one pair of N and S poles. Magnet 122 is made of flexible material.

A shape of eccentric weight 132 is shown in FIG. 7, and it substantially fits to cut-away space 12a2 of magnet 122, i.e. the shape is angled at 90° in the rotating direction with respect to its center. Lower section 13a2 of weight 132 stands in rotor frame 112. Upper section 13b2 is engaged with a hole of frame 112, and slightly protrudes from the hole. Recess 13c2 is used for engaging upper section 13b2 with frame 112.

Regarding positional relation between magnet 122 and weight 132, a part of weight 132 is placed in cut-away space 12a2, so that magnet 122 shares the rotational space with weight 132. As shown in FIG. 5, weight 132 exceeds magnet 122 in height in the axial direction, and yet extends down to opening end 11a2 of rotor frame 112, so that every nook and corner is occupied by weight 132. Further, recess 13c2 of weight 132 is engaged with engaging section 11b2 of frame 112, so that weight 132 is rigidly attached to frame 112 and secured.

As such, in this second embodiment, magnet 122 is cylindrical and a part of this cylinder is cut away at a given angle and in its total height. In this cut-away space 12a2, weight 132 is placed, so that the entire rotational space of magnet 122 can be replaced with weight 132 within the given angle. If necessary, this space can be reserved that no weight is needed to be placed in other spaces. The wasted space existed in the rotational space of the eccentric weight is thus eliminated, so that an extremely compact and thin vibration-motor is obtainable.

In the motor used in this second embodiment, the axial direction of the bearing is set parallel to the axial direction of the magnet, so that the rotor gravity in axial direction can fall within a supporting range of the bearing. As a result, load to the bearing does not increase during the spin of the rotor thereby preventing electric current from increasing. This is advantageous to downsizing the motor.

The magnet is magnetized in multi-poles, thus an area covered by an angle corresponding to several integer times of angle covered by a pair of N and S poles can be cut away to form a space. This structure allows the motor to minimize cogging torque or torque ripple due to a partial lack of magnet in the circumference direction. As a result, the motor produces substantially flat torque, and the performance and quality of the motor increase.

In the motor used in the second embodiment, a part of cylindrical rotor frame is projected inwardly so that the eccentric weight is prevented from moving in the axial direction. This structure allows a work of fixing the weight to be done with ease and the cylindrical rotor not to project outwardly so that the rotational area is not occupied uselessly. Therefore, a compact and thin motor that can produce large vibrations can be obtained.

The motor in accordance with the second embodiment has magnet 122 made of flexible material, so that the magnet is prevented from being cracked or chipped, and this structure reinforces the magnets forming a discontinuous ring.

In this embodiment, the remaining area (i.e., not cutaway) extends for an angle of 270°, for example; however, this angle can be increased or decreased when a user wants to further decrease the cogging torque or torque ripple, or increase unbalance of the motor.

Third Exemplary Embodiment

Figure 8A:
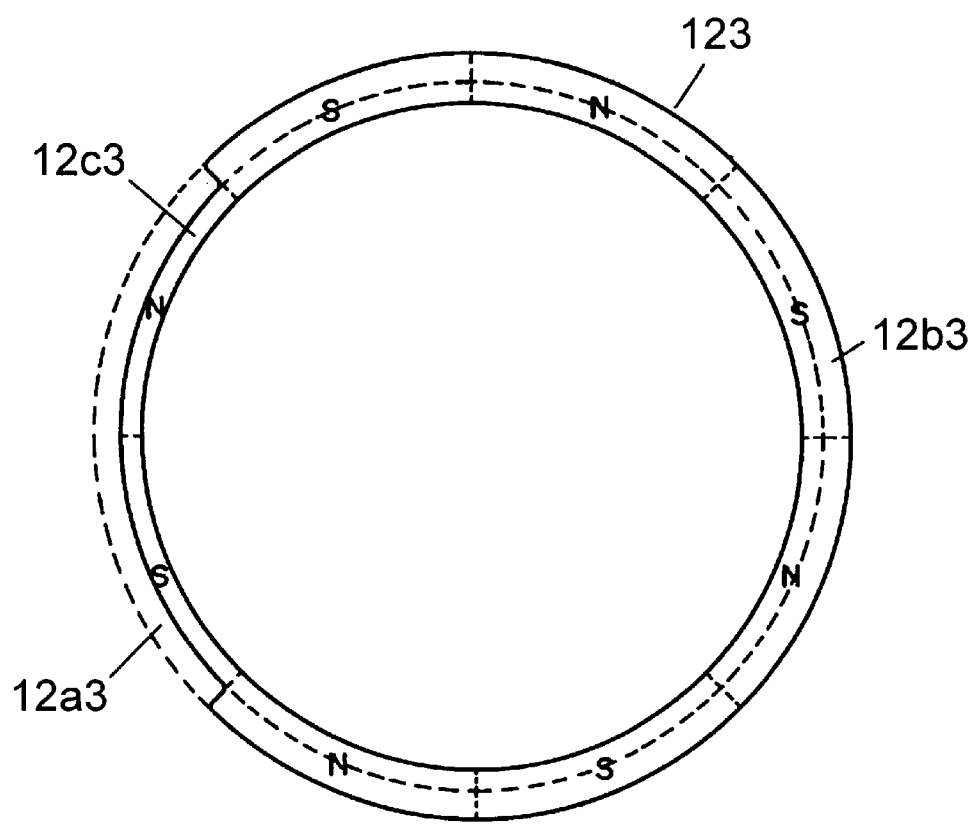
FIG. 8A is a top view of a magnet in accordance with a third exemplary embodiment of the present invention.
Figure 8B:
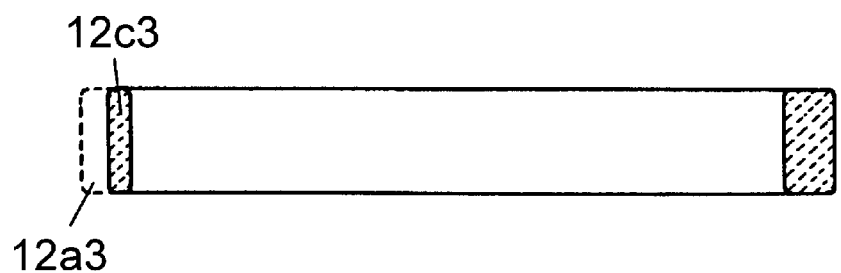
FIG. 8B is a lateral cross section of the magnet in the third embodiment.

FIG. 8A is a top view of a magnet in accordance with the third exemplary embodiment of the present invention. FIG. 8B is a lateral cross section of the same magnet. An eccentric weight is not shown in the drawings, and it is similar to the one used in the second embodiment, but the thickness of a section close to a magnet is reduced in the radius direction.

Annular magnet 123 of the third embodiment has an outer wall which is partially cut-away for an angle of 90° and leaves cutaway section 12a3. Remaining area 12b3 covers 270°. Inner left area, i.e. continued ring section, is referred to as solid area 12c3. Cutaway section 12a3 is filled by an eccentric weight, thereby producing unbalance.

Magnet 123 shapes in a cylinder having an envelope that includes an outer diameter, inner diameter and height. In the cylinder, a cutaway section ranging a given angle on a side not facing the stator core is formed in an entire height. The other side facing the stator core is solid in an entire circle. Since the magnet has a solid cylinder on the side facing the stator core, the motor produces flat torque, and this increases performance and quality of the motor. This magnet is hardly damaged while it is handled, and features a high productivity. In the case of an outer rotor type motor, a part of the outer wall is replaced with the eccentric weight, and the inner wall is used for producing torque. In this case, the weight is placed in the outer most circumference, so that great unbalance is obtainable even by a small replaced area.

Fourth Exemplary Embodiment

In the first through third embodiments, a cylindrical magnet is used; however, other shapes including the shape of the magnet may be a disc, chamfered shape, a slanted face, a curvature face, flanged shape, and the like may be used. The magnet used in the fourth embodiment is basically a disc shaped one, and the magnet is modified so that an eccentric weight is combined therewith.

Figure 9A:
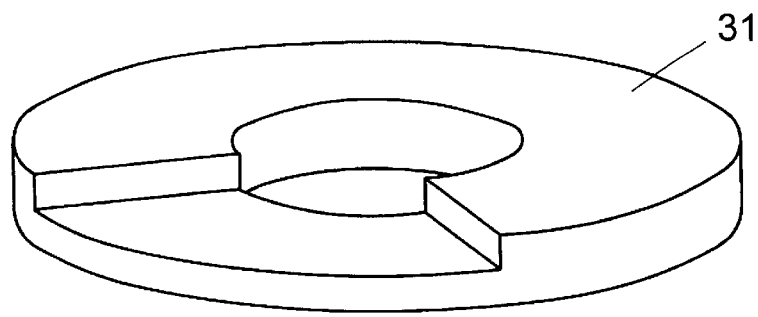
FIG. 9A shows a magnet in accordance with a fourth exemplary embodiment (using a disc-shaped magnet), and a part of the magnet is cut away.
Figure 9B:
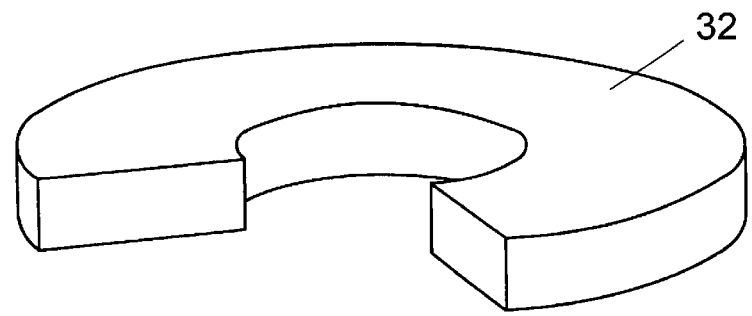
FIG. 9B shows the magnet in the fourth embodiment, and a part covering a certain angle of the magnet is cut away.
Figure 9C:
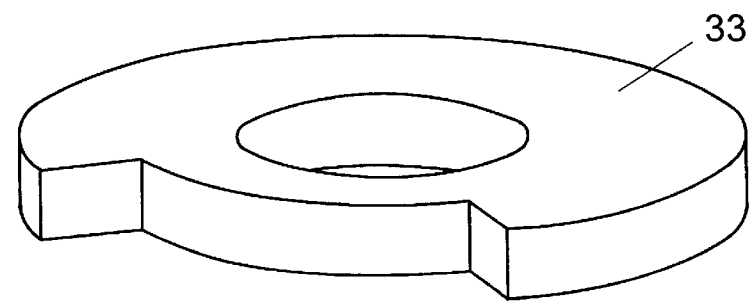
FIG. 9C shows the magnet in the fourth embodiment, and a part in a radial direction of the magnet is cut away.

FIG. 9A shows the magnet 31 in accordance with the fourth exemplary embodiment (using a disc-shaped magnet), and a part of the magnet is cut away. FIG. 9B shows the same magnet 32, and a part ranging a certain angle is cut away. FIG. 9C shows the same magnet 33, and a part in a radial direction of the magnet is cut away. The motor using one of these magnets produces the same effect as the previous embodiments.

Fifth Exemplary Embodiment

Figure 10:
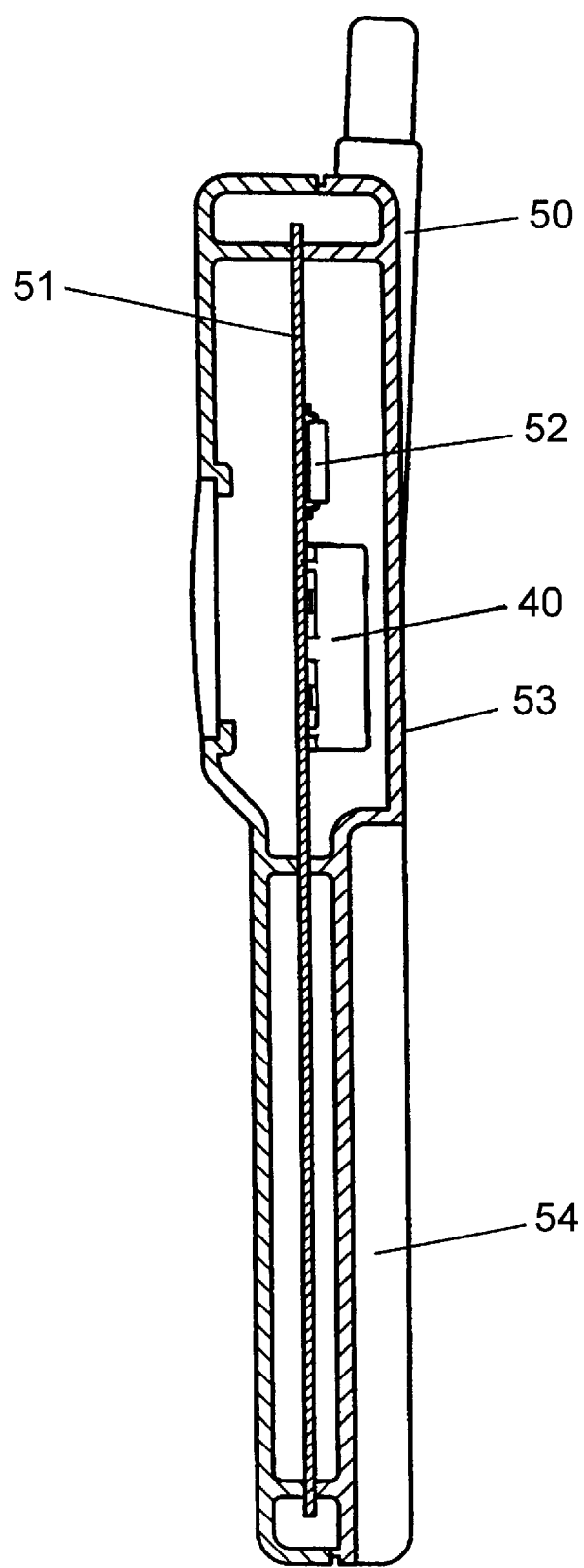
FIG. 10 is a cross section illustrating a structure of a device in accordance with a fifth exemplary embodiment of the present invention.

A device using the motor of the present invention is demonstrated hereinafter. FIG. 10 is a cross section illustrating a structure of the device in accordance with the fifth exemplary embodiment of the present invention.

In FIG. 10, device 50 is a cellular phone. Motor 40 has a structure, e.g. described in the first embodiment, and is mounted directly to device board 51. In other words, a lower face of the terminal of motor 40 is reflow-soldered to a land of the upper face of board 51. On board 51, circuit components of the device and motor driving IC 52 are reflow-soldered. Battery 54 is mounted inside of housing 53 of device 50. Battery 54 powers the circuit of device 50 and IC 52. Battery 54 also powers windings via the land of board 51 and the motor terminal, thereby exciting a stator. The attraction and repulsion between the stator and magnet spin a rotor. Since the rotor bears an eccentric weight, spinning of the rotor transmits vibrations to device 50, so that tactile information such as a call or an alarm is delivered to a user.

Board 51 is placed in parallel with a bottom face of housing 53 of the device, so that a shaft of the motor is placed vertically to board 51. Thus the vibrations travels in parallel with a bottom face of device 50.

As such, the device in accordance with the fifth embodiment can be thinned and downsized thanks to mounting the thin and compact motor therein. The motor is reflow-soldered to the device board, so that the device of high productivity and reliability is obtainable. Further, since the motor shaft is placed vertically to the bottom face of the device, vibrations travel in parallel to the bottom face. Therefore, when the device is placed on a desk, buoyancy from the desk is so little that the device is prevented from floating from the desk and falling to the floor.

The present invention, as discussed above, produces large vibrations using the eccentric weight, and places the weight in the housing of the motor. The weight and magnet are placed in the same rotational space, so that both the elements share the space. Thus useless space conventionally available inside the motor is reduced. As a result, a thin and compact motor producing large vibrations is obtainable.

The present invention is not limited to the embodiments described previously, and various modifications could be available within the scope and spirit of the present invention.

What is claimed is:

1. A motor comprising:

a stator;

a rotor facing said stator, and including a magnet and an eccentric weight, the eccentric weight is made of material having a greater specific gravity than the magnet, and a rotational area of the magnet overlaps with that of the weight at least partially;

said rotor further includes a rotor frame, and the rotor frame shape is substantially a cup having a cylindrical section and a top face, wherein the rotor frame accomodates at least a part of the eccentric weight, and a part of the cylindrical section protrudes inwardly so that the eccentric weight is prevented from moving axially.

2. The motor as defined in claim 1, wherein the magnet is made of flexible material.

3. The motor as defined in claim 1, wherein the magnet shape is a cylinder, and at least a part of the eccentric weight is disposed at a space formed by cutting away a part of the magnet.

4. The motor as defined in claim 3, wherein the space is formed by cutting away a part of one side in an axial direction of the magnet.

5. The motor as defined in claim 4, wherein the magnet is magnetized in multi-poles, and the space is formed by cutting away at least one pair of N and S poles of the multi-poles.

6. The motor as defined in claim 4, wherein the magnet is made of flexible material.

7. The motor as defined in claim 3, wherein the magnet is magnetized in multi-poles, and the space is formed by cutting away at least one pair of N and S poles of the multi-poles.

8. The motor as defined in claim 3, wherein the magnet is made of flexible material.

9. A motor comprising:

a stator having a stator core;

a rotor including a cylindrical magnet and an eccentric weight being made of material having a greater specific gravity than the magnet, wherein the stator core faces the magnet in a radial direction, and magnetic center of the magnet is differs in an axial direction from magnetic center of the stator core so that the magnet is attracted toward the stator core, and wherein at least a part of the eccentric weight is disposed at a space formed by cutting away a part of the magnet.

10. The motor as defined in claim 9, wherein the magnet is magnetized in multi-poles, and the space is formed by cutting away at least one pair of N and S poles of the multi-poles.

11. The motor as defined in claim 9, wherein said rotor further includes a rotor frame, and the rotor frame shape is substantially a cup having a cylindrical section and a top face, wherein the rotor frame accommodates at least a part of the eccentric weight, and a part of the cylindrical section protrudes inwardly so that the eccentric weight is prevented from moving axially.

12. The motor as defined in claim 9, wherein the magnet is made of flexible material.

13. The motor as defined in claim 9, wherein the space is formed by cutting away, for a total height of the magnet, a section not facing the stator core.

14. The motor as defined in claim 13, wherein the magnet is magnetized in multi-poles, and the space is formed by cutting away at least one pair of N and S poles of the multi-poles.

15. The motor as defined in claim 13, wherein said rotor further includes a rotor frame, and the rotor frame shape is substantially a cup having a cylindrical section and a top face, wherein the rotor frame accommodates at least a part of the eccentric weight, and a part of the cylindrical section protrudes inwardly so that the eccentric weight is prevented from moving axially.

16. The motor as defined in claim 13, wherein the magnet is made of flexible material.

17. The motor as defined in claim 9, wherein the space is formed by cutting away, for a total height of the magnet, a section of the magnet extending over a given angle.

18. The motor as defined in claim 17, wherein the magnet is magnetized in multi-poles, and the space is formed by cutting away at least one pair of N and S poles of the multi-poles.

19. The motor as defined in claim 17, wherein said rotor further includes a rotor frame, and the rotor frame shapes in substantially a cup having a cylindrical section and a top face, wherein the rotor frame accommodates at least a part of the eccentric weight, and a part of the cylindrical section protrudes inwardly so that the eccentric weight is prevented from moving axially.

20. The motor as defined in claim 17, wherein the magnet is made of flexible material.

21. A device comprising:

a motor;

a board on which said motor is mounted; and a driver for driving said motor, wherein said motor comprises:

a stator having a stator core;

a rotor including a cylindrical magnet and an eccentric weight being made of material having a greater specific gravity than the magnet, wherein the stator core faces the magnet in a radial direction, and magnetic center of the magnet is deviated in an axial direction from magnetic center of the stator core so that the magnet is attracted toward the stator core, and wherein at least a part of the eccentric weight is disposed at a space formed by cutting away a part of the magnet.

* * * * *

UNITED STATES PATENT AND TRADEMARK OFFICE
CERTIFICATE OF CORRECTION

PATENT NO. : 6,479,914 B2
DATED : November 12, 2002
INVENTOR(S) : Yoshida et al.

It is certified that error appears in the above-identified patent and that said Letters Patent is hereby corrected as shown below:

Column 8,
Line 67, delete "is".

Column 10,
Line 9, "shapes in" should read -- shape is --.
Lines 29-30, "is deviated" should read -- differs --.

Signed and Sealed this

Twenty-second Day of July, 2003

JAMES E. ROGAN
*Director of the United States Patent and Trademark Office*